May 5, 1964 K. SPOHN ETAL 3,131,587

SUPPLY APPARATUS FOR MACHINE TOOLS

Filed Jan. 9, 1959

INVENTORS
KARL SPOHN
GERHARD FÖLL
BY MICHAEL S. STRIKER
ATTORNEY

May 5, 1964 K. SPOHN ET AL 3,131,587
SUPPLY APPARATUS FOR MACHINE TOOLS
Filed Jan. 9, 1959 6 Sheets-Sheet 2
Fig. 3
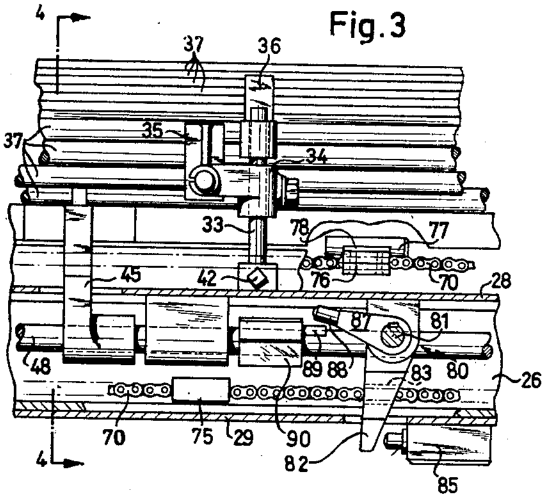
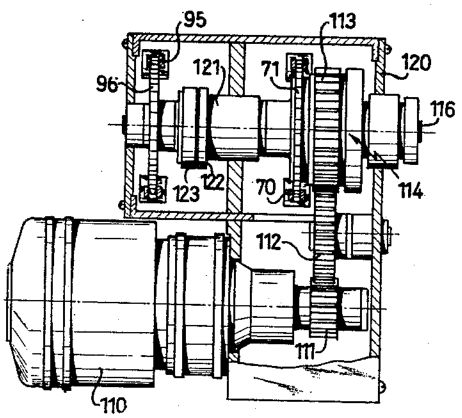
Fig. 6
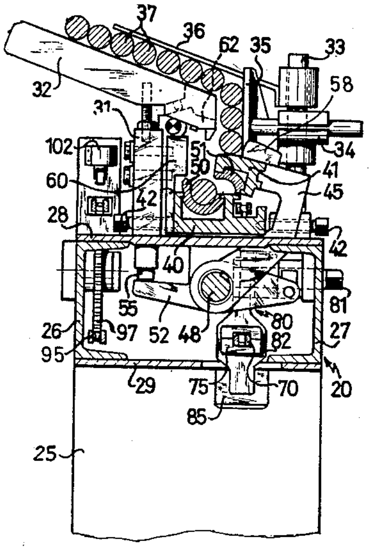
Fig. 5
Inventors
Karl Spohn
Gerhard Föll
by Michael J. Striker
Atty

SUPPLY APPARATUS FOR MACHINE TOOLS

Filed Jan. 9, 1959 6 Sheets-Sheet 3

Inventors
Karl Spohn
Gerhard Föll
by Michael J. Striker
Atty

FIG. 7
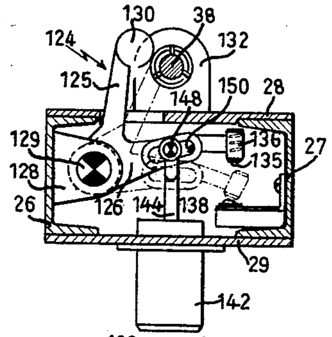
FIG. 8
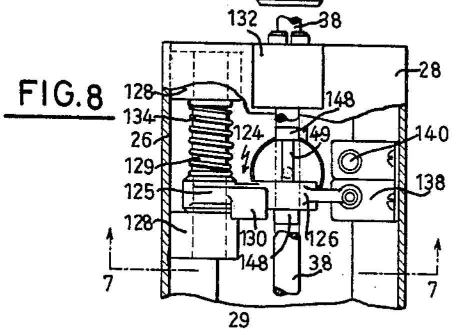
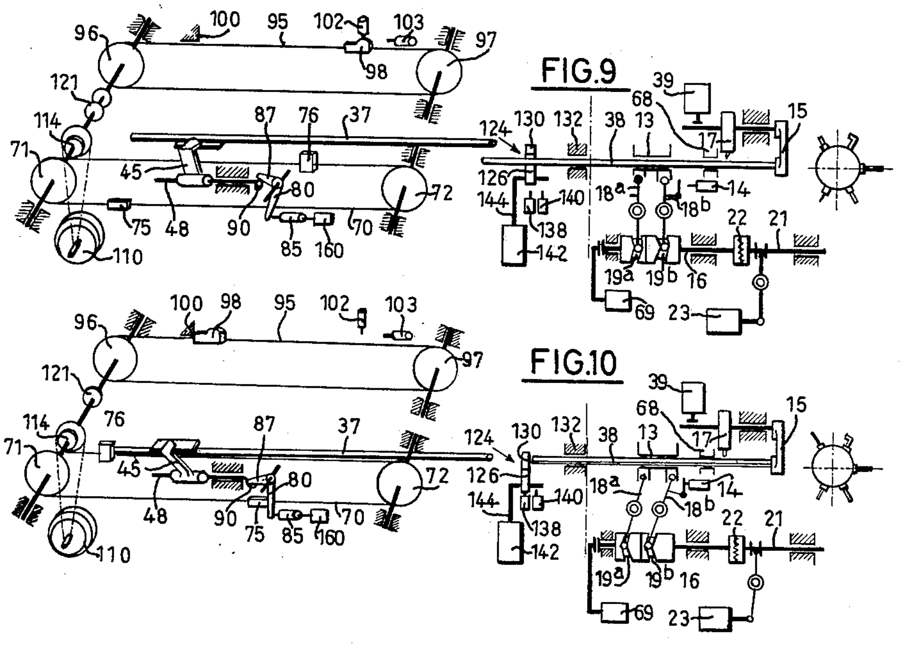
FIG. 9, FIG. 10
INVENTORS:
KARL SPOHN
GERHARD FÖLL
BY MICHAEL S. STRIKER
ATTORNEY.

May 5, 1964 K. SPOHN ETAL 3,131,587

SUPPLY APPARATUS FOR MACHINE TOOLS

Filed Jan. 9, 1959 6 Sheets-Sheet 5

INVENTORS:
KARL SPOHN
GERHARD FÖLL

BY MICHAEL S. STRIKER
ATTORNEY

May 5, 1964 K. SPOHN ETAL 3,131,587

SUPPLY APPARATUS FOR MACHINE TOOLS

Filed Jan. 9, 1959 6 Sheets-Sheet 6

3,131,587

SUPPLY APPARATUS FOR MACHINE TOOLS

Karl Spohn, Damaschkestrasse 15, Esslingen-Oberesslingen, Germany, and Gerhard Föll, Goppingen, Wurttemberg, Germany (Dresdenerstr. 14, Esslingen-Oberesslingen, Germany)

Filed Jan. 9, 1959, Ser. No. 786,666
Claims priority, application Germany Jan. 10, 1958
13 Claims. (Cl. 82—2.7)

The present invention relates to machine tools.

More particularly, the present invention relates to an apparatus for automatically supplying workpieces to a machine tool.

At the present time machine tools such as automatic lathes have devices for automatically supplying workpieces, such as long bars, thereto. However, these known supply devices have several disadvantages. In the first place a considerable amount of space is occupied by these devices, the amount of space required by the known apparatus being necessitated not only by the size of the parts but also because of the space through which they must move. Also, with known supply devices of this type a rotating workpiece engages a non-rotating element so that a considerable amount of undesirable heat is generated as a result of friction. Also, it does not infrequently happen that the starting end of a new workpiece is not handled properly with the known apparatus so that tools can become broken.

One of the objects of the present invention is to overcome the above drawbacks by providing a supply apparatus of the above type which occupies an extremely small amount of space and which does not require any free space through which parts must move and which does not require undesirable friction forces to be set up.

Another object of the present invention is to provide an automatic supply apparatus capable of automatically feeding elongated workpieces in succession to a machine tool even though the several workpieces vary considerably in their length.

An additional object of the present invention is to provide an automatic supply device of the above type which will guarantee the proper automatic location of the front end of each workpiece on the machine tool so that the machine tool will operate properly on the front end of each workpiece and thus will avoid undesirable breaking of tools.

A further object of the present invention is to provide a supply apparatus of the above type which is capable of automatically supplying workpieces in succession to a machine tool without any interruption in the operation of the latter.

The objects of the present invention also include the provision of an exceedingly simple and rugged apparatus capable of accomplishing all of the above objects.

With the above objects in view the present invention includes in a supply apparatus for automatically supplying elongated workpieces in succession to a machine tool, a support means and a guide means carried by the support means for guiding a workpiece for movement toward the machine tool. A moving means is carried by the support means for forward and rearward movement, and this moving means, during its forward movement, engages the rear end of a workpiece carried by the guide means to advance the workpiece toward the machine tool. A control member is connected to the moving means to be moved forwardly when the moving means moves rearwardly and to be moved rearwardly when the moving means moves forwardly. A release means is carried by the support means for releasing a workpiece to the guide means, and this release means includes a portion located in the path of forward movement of the control member to be actuated by the latter for releasing a workpiece to the guide means. A suitable drive means is operatively connected with the workpiece moving means for driving the latter forwardly and rearwardly, and a means is also actuated by engagement of the control member with a release means for stopping the operation of the drive means to stop the rearward movement of the moving means upon engagement of the control member with the release means. A feeler means is located at the front end of the support means for detecting the absence of a workpiece, and when the feeler means detects the absence of a workpiece the feeler means initiates the operation of the drive means to drive the moving means rearwardly. The engagement of the control member with the release means also serves to initiate, after a predetermined time, the actuation of the drive means to drive the moving means forwardly so as to advance the workpiece toward the machine tool. The above-mentioned feeler means, in addition to detecting the absence of a workpiece, serves, upon being engaged by the front end of a workpiece, to set into operation a means which automatically controls the extent to which each workpiece is advanced after its front end engages the feeler means so as to automatically control the location of the front end of the workpiece on the machine tool for proper cooperation with the latter.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 3 is a partly sectional fragmentary front elevational view on an enlarged scale, as compared to FIG. 1, of part of the supply apparatus of the invention, FIG. 3 being taken along line 3—3 of FIG. 4 in the direction of the arrows;

FIG. 5 shows the structure of FIG. 4 in a different position of the parts;

FIG. 6 is a sectional view taken along line 6—6 of FIG. 1 in the direction of the arrows and illustrating the drive means of the structure of the invention;

FIG. 7 is a sectional view taken along line 7—7 of FIG. 8 in the direction of the arrows and showing the feeler means of the present invention, FIG. 7 also being taken along line 7—7 of FIG. 1 in the direction of the arrows;

FIG. 8 is a sectional plan view of the structure of FIG. 7;

Figure 15:
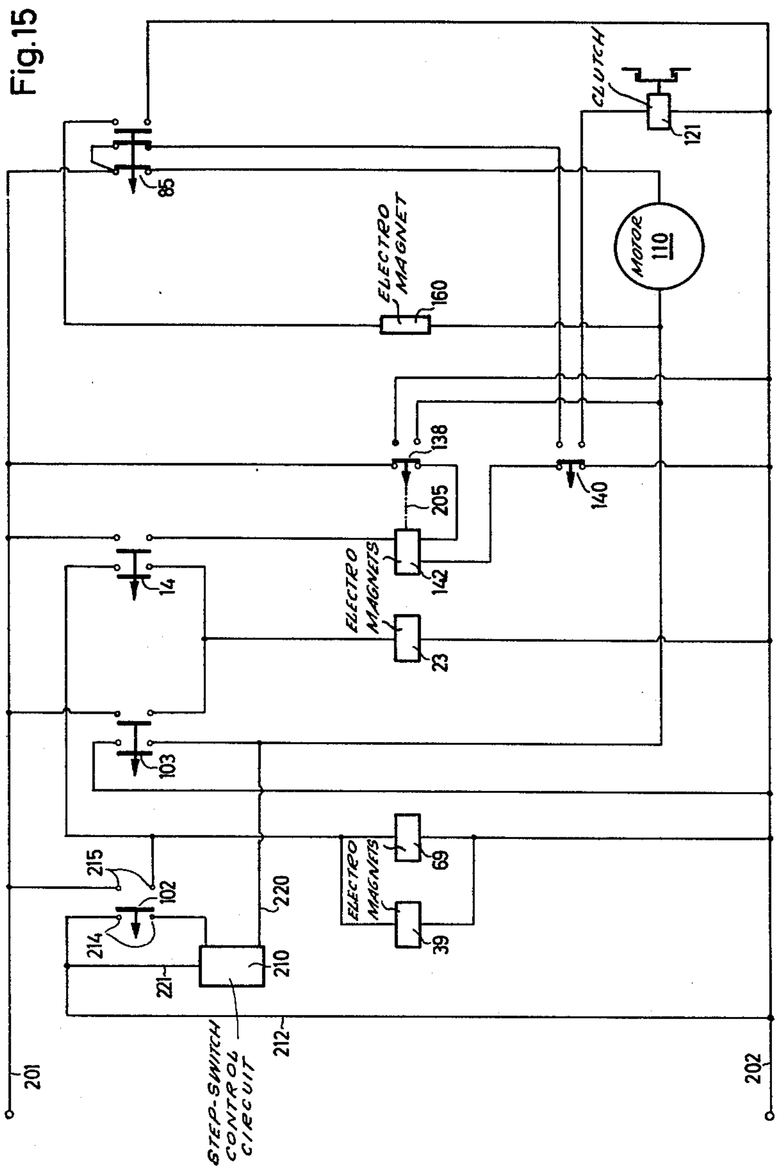

FIGS. 9–14 diagrammatically illustrate various stages in the operation of the structure of the invention; and FIG. 15 is a wiring diagram.

Figures 1, 2:
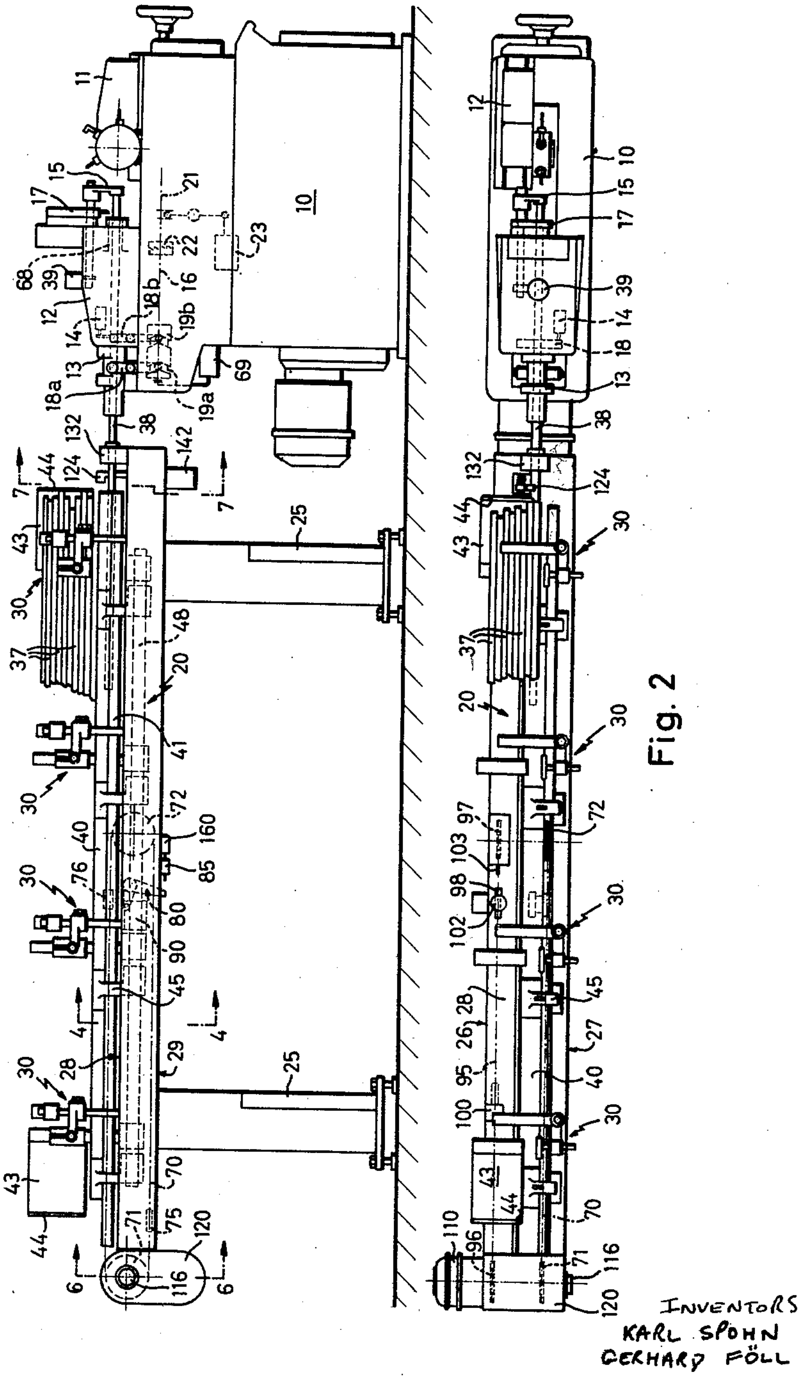
FIG. 1 is a partly schematic side elevational view of a supply apparatus according to the present invention shown together with a machine tool.
FIG. 2 is a top plan view of the structure of FIG. 1.

The machine tool shown at the right in FIGS. 1 and 2 is in the form of an automatic turret lathe which is of a well known construction, so that the details of this machine tool are not described and only enough of the machine tool is described to afford a complete understanding of the invention. The machine tool includes a supporting frame 10 which carries, as shown at the upper right of FIG. 1, a turret carriage 11, and opposite the turret carriage 11 the machine tool is provided with a spindle assembly 12 which holds and rotates the workpiece in the form of an elongated bar in a well known manner. A workpiece feeding device 13 forms part of the spindle assembly 12, and this assembly is provided at its front end with a stop member 15 which swings around a horizontal axis in a known way for determining the position of the front end of the workpiece before the series of operation are performed thereon by the machine tool. Thus, as may be seen from FIGS. 1 and 2 the front end of the workpiece 38 is engaged by the stop member 15 which accurately determines the position of the workpiece. Then the stop member 15 is swung in a known way out of the path between the workpiece and the turret carriage 11 so that the operations can go forward on the workpiece. The workpiece is rotated around its axis by the spindle assembly 12, and during rotation of the workpiece the several tools of the turret serve to bore the workpiece, thread the bore thereof, etc. Of course, these operations are given only by way of example, and any desired operations may be formed in a well known manner on the workpiece.

An electromagnetic device 39 is operatively connected through a rod 15*a* with the swingable stop member 15 for locking the latter at a predetermined time so that at such time the stop member 15 is prevented from swinging down to the position shown in FIG. 1.

The feeding device 13 is provided with known gripping elements which grip the work and feed the same forwardly and which then release the work during the rearward movement of the work engaging elements of the feeding device. The machine tool includes a rotary control shaft 16 which carries a feeding cam 19*a* and a work gripping cam 19*b*, the latter turning together with the shaft 16. For a purpose described below the cam 19*a* is not in direct driving engagement with the shaft 16 but is instead driven through frictional engagement with the cam 19*b* so that it is possible to stop the rotation of the cam 19*a* while the cam 19*b* continues to turn with the shaft 16. The cam 19*a* serves to turn a feeding fork member 18*a* which engages the feeding carriage 13 to shift the latter forwardly and rearwardly, while the cam 19*b* turns a fork member 18*b* which is operatively connected with the gripping elements 68 for actuating the latter to grip the workpiece so that the latter moves with the carriage 13 during forward movement of the latter and to release the workpiece during rearward movement of the carriage 13. These control cams 19*a* and 19*b* as well as the rest of the feeding device 13 are of a well known construction and they are driven in a known way from the motor of the machine tool which drives the shaft 21 which is connected through the clutch 22 to the shaft 16 for driving the latter, as indicated diagrammatically in FIG. 1. As is also shown diagrammatically in FIG. 1, an electromagnetic means 23 is operatively connected with the clutch 22 for placing the latter in its engaged or disengaged positions. An electromagnetic device 69 is operatively connected with the cam 19*a* through a link 69*a* for stopping the rotation thereof with the shaft 16 and cam 19*b* when the magnet 69 is energized, so that at this time only the cam 19*b* will rotate with the shaft 16. Also, the machine tool is provided at the front end of the spindle assembly 12 with a cut-off tool 17 which serves to machine the front end of the workpiece as well as to cut off a section thereof in a well known way.

The above description relates to the known machine tool shown at the right in FIGS. 1 and 2. The supply apparatus of the invention which automatically supplies workpieces in succession to the machine tool will now be described.

Figure 4:
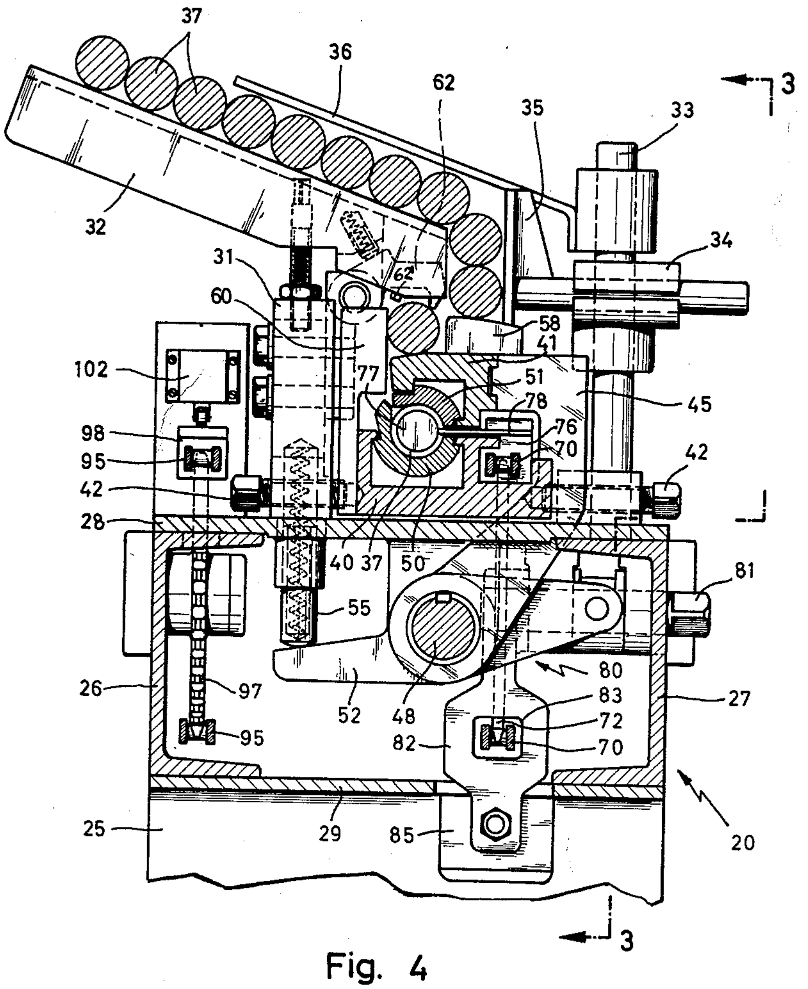
FIG. 4 is a transverse sectional view taken along line 4—4 of FIG. 3 in the direction of the arrows.

The supply apparatus of the present invention is shown in FIGS. 1 and 2 at the left of the automatic machine tool. This supply apparatus includes a support means made up in part of a main frame 20 which extends horizontally along the entire length of the supply apparatus and which is supported on the floor by suitable standards 25. As is best shown in FIGS. 4 and 5 the main frame 20 is made up of a pair of opposed side beams 26 and 27 of substantially U-shaped cross section, these beams being fixed to a top plate 28 and a bottom plate 29 to form the elongated hollow frame 20 having the cross section indicated in FIGS. 4 and 5. As may be seen from FIGS. 1 and 2 four guide devices 30 are carried by the main frame 20, and these devices 30 include structure which forms a guide means for the workpieces supplied by the apparatus of the invention as well as a release means for releasing the workpieces one by one to the guide means in succession. The workpieces 37 are shown in FIGS. 1–5, and they are illustrated broken off in FIGS. 1 and 2 between the first and second devices 30. This illustration is only for the sake of clarity. The workpieces 37 extend to the left along substantially the entire length of the supply apparatus, and these workpieces may have any desired length greater than approximately one half of the length of the frame 20.

The details of each device 30 are shown most clearly in FIGS. 3–5. The top plate 28 fixedly carries a support member 31 which extends upwardly from the top plate 28, and this support member 31 fixedly carries a guide rail 32 inclined downwardly toward the right as viewed in FIGS. 4 and 5. Laterally spaced to the right of the member 31, as viewed in FIGS. 4 and 5, is a stationary bar 33 also fixed to and extending upwardly from the top plate 28, and a holding bracket 34 is adjustable along the bar 33 and can be fixed to the latter at any desired position therealong. This bracket 34 carries a stop plate 35 having a substantially vertical left end face, as viewed in FIGS. 4 and 5. Also, the bar 33 fixedly carries a cover plate 36 which is parallel to the guide rail 32 and located thereover so that the parts 32, 35 and 36 form a guide passage for the supply of workpieces 37, as is indicated most clearly in FIGS. 4 and 5. As may be seen from FIGS. 1 and 2, the pair of end devices 30 are provided with guide plates 43 which respectively terminate at their outer ends in flanges 44 which determine the longest length of the workpieces capable of being handled by the supply apparatus of the invention.

As is shown in FIGS. 4 and 5, a guide means 40, 41 is arranged on the top plate 28 between the members 31 and 33 of each device 30. This guide means serves to guide each workpiece during its axial movement toward the machine tool to the right, as viewed in FIGS. 1 and 2. The guide means includes a lower stationary part 40 fixed by screws 42 to the members 31 and 33 and an upper part 41 carried by the lever 45. This lever 45 extends downwardly through a cutout in the top plate 28 (FIG. 3), and at its bottom end the lever 45 is fixed to a shaft 48 which extends through a suitable opening of the lever 45 and to which the lever 45 is keyed. The shaft 48 extends along substantially the entire length of the supply apparatus, as evident from FIG. 1, and each of the levers 45 of the several devices 30 is fixed to the shaft 48 so that when the latter turns about its axis all of the levers 45 will turn simultaneously therewith, this shaft 48 being supported for turning movement around its axis by any suitable bearings carried by the main frame 20. The stationary guide members 40 respectively carry guide shells 50 while the movable guide members 41 respectively carry guide shells 51 which respectively cooperate with the guide shells 50 to form substantially cylindrical passages therewith, as is evident from FIG. 4. The lever 45 of each device 30 is provided at its bottom end with an extension 52 which extends to the left of the shaft 48, as indicated in FIG. 4, and a spring-pressed pin 55 bears against the extension 52 to urge the lever 45 and the shaft 48 in a counterclockwise direction, as viewed in FIG. 4, to the position shown in FIG. 4. The pin 55 is guided in a suitable tube and the spring which acts on the pin 55 is not shown for the sake of clarity. Thus, the spring-pressed pin 55 normally holds the lever 45 and the guide elements 41 and 51 fixed thereto in the position illustrated in FIGS. 3 and 4.

The guide element 41, and the lever 45 therewith, fixedly carry a projection 58 which extends upwardly from the elements 41, 45 as shown in FIGS. 4 and 5. This projection 58 forms the lower end of the guide passage of the workpiece magazine, when the parts have the position indicated in FIG. 4. The projection 58 together with the stop member 60 which is carried by the member 31, and the top surface of element 41 to the left of projection 58, as viewed in FIG. 4, cooperate together to form a chamber which receives a workpiece 37 which is in readiness to be released for dropping into the space between the shells 50 and 51 of the guide means. The projection 58 serves to prevent any additional bars 37 from moving toward the chamber in which the lowermost bar 37 of FIG. 4 is located. The member 31 also pivotally supports a pawl 62 which is urged to turn by a spring-pressed pin in a clockwise direction, as viewed in FIG. 4, and this pawl 62 engages the upper surface of the lowermost bar 37 of FIG. 4 to the right of the axis thereof, so that the pawl 62 serves to prevent the bar from shifting to the right, as viewed in FIG. 4, toward the projection 58. When the parts have the position indicated in FIG. 5 the pawl 62 engages a stop member 62′ carried by element 32 to limit the clockwise turning of the pawl 62.

At the front end of the supply apparatus of the invention, which is to say the right end of the main frame 20, as viewed in FIGS. 1 and 2, is located a feeler means which is described in detail below, and this feeler means serves to automatically detect the absence of a workpiece at the front end of the main frame 20. As soon as the absence of a workpiece at the front end of the main frame 20 is detected by this feeler means, the levers 45 of the several devices 30 are simultaneously turned in a clockwise direction from the position of FIG. 4 to that of FIG. 5 against the force of the spring-pressed pins 55, and in this way the member 58 turns from the position of FIG. 4 to that of FIG. 5. Thus, as may be seen from FIGS. 4 and 5, the workpiece 37 which rests on the projections 58 in the position of the parts shown in FIG. 4 has now moved downwardly to a position on top of element 41 just to the left of the projection 58 in the position of the parts shown in FIG. 5 and simultaneously the bar 37 between projection 58 and stop 60 in the position of the parts shown in FIG. 4 has dropped down to the shells 50 of the stationary guide elements 40. When the levers 45 return under the action of the spring-pressed pins 55 to their rest position as shown in FIG. 4 the bar next to the projections 58 will be shifted to the left to become located next to the stops 60, and during this movement the bar will raise the pawls 62 slightly and then these pawls will assume the position shown in FIG. 4 where they prevent the bar from moving to the right toward the projections 58.

Each workpiece which is guided by the above-described guide means is moved forwardly toward the machine tool by a moving means which includes the element 77 shown in FIG. 4 in its position coaxial with the axis of the cylindrical guide shells 50 and 51. This moving means which includes the element 77 is supported for reciprocation forwardly and rearwardly. It includes in addition to the element 77 which is at all times coaxial with the guide means a plate 78 which carries the element 77, and this plate 78 is itself fixedly carried by a block 76 which is fixed to the upper run of an endless chain 70 which extends around the rear sprocket wheel 71 and the front sprocket wheel 72, as is shown in FIG. 1. The front sprocket wheel 72 is located approximately at the center of the main frame 20. The lower run of the endless sprocket chain 70 carries a control member 75 which is fixed to this lower run and is also in the form of a block of suitable dimensions. It will be seen that this interconnection of elements 75 and 76 through the sprocket chain 70 and sprocket wheels 71 and 72 serves as a means for connecting the control member 75 to the work moving means 76–78 in such a way that when the latter moves forwardly the control member 75 moves rearwardly and vice versa. As is evident from FIG. 4 the upper parts 41, 51 of the guide means, on the one hand, and the lower parts 40, 50 thereof, on the other hand, define between themselves a free passage through which the plate 78 can freely pass as indicated in FIG. 4, so that the relatively short member 77 can move freely through the shells 50 and 51 of the successive devices 30 upon movement of the upper run of the chain 70 to the right, as viewed in FIGS. 1 and 2. When the lever 45 is actuated so that it turns to the position indicated in FIG. 5 the moving means 76–78 is at a position spaced from the devices 30 so that it does not interfere with the turning of the levers 45.

The levers 45 together with the shaft 48 connected thereto form part of a release means for releasing the several workpieces 37 successively into the guide means. This release means includes also a release lever 80 shown in FIG. 1 to the left of the sprocket wheel 72. As may be seen from FIG. 3 this release lever 80 is fixedly carried by a bar 81 which is supported for rotary movement about its axis by the main frame 20. The lever 80 includes a downwardly directed arm 82 which is formed with a cutout 83 (FIG. 4) through which the lower run of the endless chain 70 freely passes. The arm 82 of the release means forms a portion thereof which is located in the path of movement of the control member 75 so that when the latter moves forwardly during rearward movement of the workpiece moving means this control member 75 will engage the arm 82 to actuate the release means in a manner described below. The control member 75 will turn the lever 80 in a counterclockwise direction, as viewed in FIG. 3, and the arm 82 will, during such turning, engage the switch 85 to actuate the latter. The release lever 80 also includes an arm 87 (FIG. 3) which is provided with a free end portion 88 which, during counterclockwise turning of the lever 80 upon engagement of portion 82 thereof by the control member 75, moves downwardly into engagement with a pin 89 which is fixedly carried by a lever 90 which is fixed to and extends from the shaft 48, so that this counterclockwise turning of the lever 80, as viewed in FIG. 3, serves to turn the shaft 48 in a clockwise direction, as viewed in FIGS. 4 and 5, for turning the levers 45 from the position of FIG. 4 to that of FIG. 5 to produce the above-described results.

As is best shown in FIG. 2, a second endless chain 95 is parallel to and spaced from the chain 70, this chain 95 extending around the rear sprocket wheel 96 and the front sprocket wheel 97, all of the sprocket wheels being supported for turning movement around their axes, respectively. The manner in which the sprocket wheels 71 and 96 are supported and turned is described below. The upper run of the chain 95 carries a switch-operating cam 98, and the main frame 20 carries a stationary stop 100 located in the path of rearward movement of the cam 98 to limit the rearward movement of the latter together with the turning of the chain 95 in the direction which moves the cam 98 rearwardly. During forward movement of the cam 98 from the stop 100, this cam moves along a path which intersects a switch 102 so that the latter is actuated by the cam 98, and during the continued forward movement of the cam 98, the latter will move beyond the switch 102 into engagement with a further switch 103, and this switch 103 serves also as the forward limit of travel of the cam 98.

A drive means is provided for driving the endless chains in both directions, and the details of this drive means is shown most clearly in FIG. 6. As may be seen from FIG. 6, the drive means includes a driving motor 110 fixedly carried by the frame of the supply apparatus, and this motor 110 drives a pinion 111 which in turn drives an intermediate gear 112 which meshes with a gear 113 which forms part of a slip clutch indicated in its entirety by 114. This slip clutch 114 is carried by a shaft 116 supported for rotation about its axis by a housing 120 in which the slip clutch 114 is located. This housing is located at the rear end of the main frame 20, as indicated in FIGS. 1 and 2. The slip clutch 114 is freely turnable on the shaft 116 to which the sprocket wheel 71 is fixed. Thus, the slip clutch 114 frictionally engages the sprocket wheel 71 to turn the latter while if something prevents the turning of the sprocket wheel 71 the slip clutch 114 can continue to turn with respect to the shaft 116 and the sprocket wheel 71, sliding along the latter. The shaft 116 also carries an electromagnetic clutch 121 which includes a clutch portion 122 which is fixed to the shaft 116 for rotation therewith. The other part 123 of this clutch 121 is freely turnable on the shaft 116 and fixed with the sprocket wheel 96, so that the latter is driven only when the clutch 121 is energized.

As was mentioned above, there is located at the front end of the main frame 20 of the support means of the supply apparatus of the invention a feeler means capable of automatically detecting the absence of a workpiece from the front end of the support means. This feeler means includes, as shown most clearly in FIGS. 7 and 8, a two-armed lever 124 which is pivotally supported by a structure carried by the left wall 26 of the main frame 20, as viewed in FIG. 7. This left wall 26 carries a pair of brackets 128 which support between themselves a bar 129 on which the lever 124 is pivoted, a spring 134 being coiled around this bar 129 and urging the lever 124 rearwardly into engagement with the bracket 128 shown at the lower part of FIG. 8. The lever 124 of the feeler means includes an arm 125 which carries at its free end a feeler disc 130, and when the lever 124 is turned in a clockwise direction, as viewed in FIG. 7, from the solid to the dot-dash line position shown in FIG. 7, the disc 130 will be located in the path of movement of a workpiece. As is shown most clearly in FIGS. 7 and 8, the top plate 28 of the main frame 20 fixedly carries a guide member 132 through which the workpiece 38 moves, this guide member 132 forming part of the guide means of the structure of the invention.

The lever 124 of the feeler means also includes a second arm 126 which carries at its free end a ball member 135 located in an opening of a suitable chamber carried by the free end of the arm 126. A spring 136 is located in this chamber to urge the ball member 135 downwardly, the opening through which the ball member 135 extends being too small to allow the ball member 135 to move downwardly beyond the position thereof shown in solid lines in FIG. 7. It will be seen that in the dot-dash line position of the lever 124 shown in FIG. 7, the ball member 135 has engaged the switch 138 to actuate the latter, and as may be seen from FIG. 8, when the lever 124 has been shifted forwardly along the shaft 129 the ball member 135 may engage a switch 140 in order to actuate the latter.

The lever 124 is actuated by an electromagnet 142 which includes a spring which serves to maintain the parts in the solid line position shown in FIG. 7 when the electromagnet 142 is not energized. The armature of the electromagnet is connected with a bar 144 which is fixed at its top end to a bar 149 extending parallel to the bar 129, and this bar 149 extends through an elongated slot 150 of the lever arm 126, so that the lever 124 can shift along the bar 129 while at the same time the bar 149 extends through the slot 150. The upper end of the bar 144 is bifurcated so as to be provided with the end portions 148 which are respectively fixed to the ends of the bar 149 so that the lever 124 can shift along the bar 129 without interference from the bar 149. When the electromagnet 142 is energized the rod 144 together with the bar 149 will be moved downwardly so as to turn the lever 124 to the dot-dash line position thereof indicated in FIG. 7.

As will be apparent from the description which follows, the endless chain 95 together with all of the structure carried and operated thereby forms a means which cooperates with the feeler means for accurately determining the position of the front end of each workpiece on the machine tool.

The operation of the above-described structure follows in connection with FIGS. 9–14 which diagrammatically illustrate the structure at various stages in the operation thereof. In FIGS. 9–14 the machine tool is shown at the right of the vertical dot-dash line while the supply apparatus of the invention is shown at the left of this line.

Referring now to FIG. 9, it will be seen that a workpiece 38 is located in the automatic machine tool, and the rear end portion of this workpiece still is located at the supply apparatus of the invention extending through the guide member 132 at the front end of the supply apparatus, and extending rearwardly from the guide member 132 beyond the lever 124 of the feeler means. The feeding of the workpiece 38 is carried out in a known way by the device 13 of the machine tool, this device 13 being controlled in a known way from the rotary control shaft 16, as described above. The workpiece 38 is fed by the device 13 until its front end engages the swingable stop member 15. During feeding of the workpiece the turning fork member 18*b* actuates the switch 14 which upon being closed in this way energizes the electromagnet 142 of the feeler means. This electromagnet pulls downwardly on the rod 144 and seeks to turn the lever 124 in a clockwise direction, as viewed in FIG. 7, toward the dot-dash line position of lever 124. During this turning of the lever 124 the feeler disc 130 engages the bar 38 so that the lever 124 is prevented by the bar 38 from turning to the dot-dash line position shown in FIG. 7 until the feeler means detects the absence of the workpiece from the path of turning movement of the feeler disc 130. Thus, with the parts in the position of FIG. 9 the workpiece 38 prevents actuation of the switch 138.

When the workpiece 38 has been advanced to the position indicated in FIG. 10 so that its rear end is located forwardly of the lever 124, the workpiece 38 will no longer be in the path of movement of the disc 130 so that upon closing of switch 14 by the fork 18*b* and consequent energizing of the electromagnet 142 the lever 124 will turn downwardly a distance sufficient to cause the switch 138 to be actuated by the arm 126 of lever 124. The closing of the switch 138 causes through its electrical connection with the motor 110 the latter to be driven in a reverse direction which produces rearward movement of the upper run of the chains 70 and 95. This driving of the chain 70 will cause forward movement of the control member 75 so that the latter moves forwardly into engagement with the release lever 80. The clutch 121 is energized at this time so that the upper run of chain 95 also moves rearwardly and thus the switch-operating cam 98 moves rearwardly from the position of FIG. 9 to that of FIG. 10 where it engages the stationary stop 100. Upon turning of the lever 80 by the control member 75, not only is a workpiece released for movement into the guide means as described above, but in addition the switch 85 is actuated, and the actuation of this switch serves to turn off the motor 110 and thus stop the movement of the chains. The parts are so designed that when the switch 85 is actuated in this way the cam 98 has just reached the stop 100. It will be noted also that during this phase of the operation the workpiece moving means 76–78 has moved rearwardly from the position of FIG. 9 to that of FIG. 10, this moving means being shown diagrammatically in FIG. 10 as well as FIGS. 9 and 11–14 by the element 76 alone.

The turning of the lever 80 in this manner causes the arm 87 to move pin 90 so as to turn the shaft 48 and thus the levers 45 to their open position shown in FIG. 5. Thus, a new workpiece 37 falls into the guide means.

A time-delay relay 160 is connected with the switch 85 to be actuated therewith, and this time-delay serves to initiate the operation of the motor 110 in the direction which moves the upper run of chain 70 forwardly at a predetermined interval after actuation of switch 85, this interval being long enough to guarantee falling of the next workpiece into the guide means.

Figures 11, 12, 13, 14:
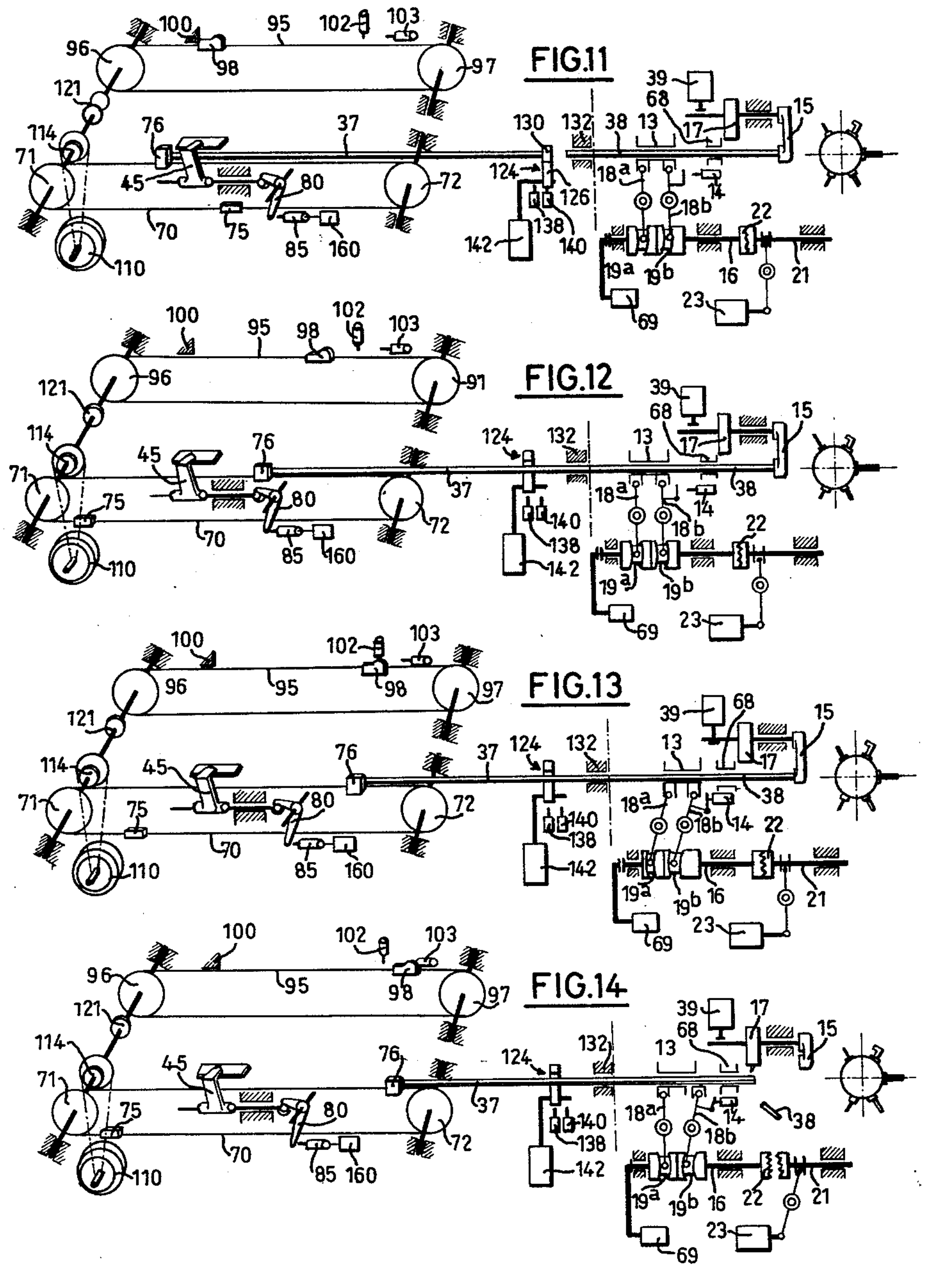

At this time the clutch 121 is not energized, as indicated in FIG. 11, so that the chain 95 is not actuated and the cam 98 remains in the position shown in FIGS. 10 and 11 while the workpiece is advanced forwardly along the guide means by the moving means 76–78 as indicated in FIG. 11. Of course, the control member 75 moves rearwardly at this time so as to leave the lever 80 and now the spring-pressed pins 55 act on the levers 45 to return the latter to the position of FIG. 4 and at the same time the pin 90 turns with the shaft 48 to return the lever 80 to its rest position shown in FIGS. 3 and 11. The upper shells 51 will thus be moved to their position shown in FIG. 4 over the shells 50 and the moving means 76–78 will move forwardly until element 77 engages the rear end of the workpiece 37 which has just been released into the guide means. In this way the structure of the invention is capable of automatically accommodating workpieces of different lengths. The moving means now moves the workpiece 37 forwardly until its front end engages the rear end of the portion of workpiece 38 which is still in the machine tool. However, before this happens the front end of the workpiece 37 will engage the feeler disc 130, as shown in FIG. 11, so that the lever 124 will be shifted forwardly along the bar 129 and the arm 126 thereof will leave the switch 138 and will actuate the switch 140 as indicated in FIG. 11, the spring 134 being compressed at this time. The actuation of the switch 140 serves to deenergize the electromagnet 142 so that the lever 124 returns to its rest position and the disc 130 is no longer in the path of movement of the workpiece 37. The actuation of switch 140 also serves to energize the clutch 121 so that the forward movement of the cam 98 starts precisely at the moment when the front end of the workpiece 37 has located the arm 126 at position where it actuates the switch 140. During the time that the forward movement of the workpiece 37 is retarded by the disc 130 the motor 110 is not turned off. Instead it continues to turn and the clutch 114 starts to slip. Inasmuch as the motor 110 operates continuously at this time the workpiece is advanced forwardly beyond the lever 124 to engage with its front end the rear end of the workpiece 38, as described above, this workpiece 38 having in the meantime been advanced by a predetermined increment by the device 13 since during the above-described operations of the supply apparatus of the invention the machine tool continues to operate without interruption. The coaxial workpieces 37 and 38 now remain in end-to-end engagement during the subsequent operations of the machine tool and the motor 110 continuously seeks to advance the workpiece 37 forwardly. However, as long as the workpiece 38 does not advance the workpiece 37 cannot advance and the clutch 114 slips.

As was pointed out above, the clutch 121 is energized simultaneously with actuation of the switch 140 so that the cam 98 has been advancing forwardly toward the switch 102. FIG. 12 shows the workpieces 37 and 38 in end-to-end engagement and the cam 98 at a position intermediate the stop 100 and the switch 102. When the workpiece 38 has been advanced to the position indicated in FIG. 13 the cam 98 will have reached the switch 102 to actuate the latter and to indicate through any suitable indicating device actuated by switch 102 that the last portion of the workpiece 38 is being worked on by the machine tool. This switch 102 additionally serves to energize the magnet 39 which cooperates with the swingable stop member 15 to lock the latter against movement during the subsequent cycle illustrated in FIG. 14, and also actuation of switch 102 serves to energize the magnet 69 so as to lock the work-advancing cam **19*a* and thus maintain the carriage of the feeding device 13** stationary during the next operating cycle.

When the last portion of workpiece 38 has been cut off by the tool 17 the feeding carriage of the device 13 remains stationary. The tiltable fork **18*b* actuates the switch 14 and the latter together with the switch 102 are connected into the circuit of the electromagnet 23 for energizing the latter when the switches 14 and 102 are simultaneously actuated so that the clutch 22 is disengaged and the rotation of the control shaft 16 stops, this stopping of the rotation of the control shaft 16 taking place when lever 18*b* is in a position where the work gripping elements 68 are spaced from the work. Since the motor 110 continues to operate the workpiece 37 is freely advanced at this time and the last end of the workpiece 38 is ejected as indicated in FIG. 14. At this time the cam 98 advances forwardly beyond the switch 102 into engagement with the switch 103 and in this way the workpiece 37 is located in position to have its front end portion cut off by the tool 17. The actuation of the switch 103 serves to reverse the direction of rotation of the motor 110 so that the upper runs of the chains 70 and 95 now move rearwardly and the cam 98 and workpiece moving means 76–78 return to their starting position illustrated in FIG. 9. At this time the cam 98 actuates a portion of the switch 102 different from that actuated by cam 98 during forward movement thereof, and this actuation of switch 102 during rearward movement of the cam 98 serves to turn off the motor 110**.

Also, the actuation of the switch 103 deenergizes magnet 23 so that the clutch 22 becomes engaged to transmit the drive to the shaft 16 and at the same time the magnet 39 is deenergized to unlock the stop member 15. Also the magnet 69 is deenergized at this time so that feeding of the workpiece by the device 13 can now continue. The first portion of the workpiece is cut off by the tool 17 and then the cycles of operation of the machine tool continue in the normal way.

FIG. 15 shows a simplified wiring diagram of the electrical equipment. The main parts are designated with the same numerals as in FIGS. 1 to 14. Furthermore all parts are shown at rest and the switches when actuated by mechanical parts return under the action of springs not shown to this position. The supply lines of a source of electric power are designated by 201 and 202. Electromagnet 142 is connected at rest through switch 140 to line 202 and may be connected to line 201 through switch 14.

Electromagnet 142 which is electrically connected to switch 138 is also mechanically connected to this switch and this connection is represented by a dotted line 205.

Switch 14 is connected to switch 103 and between the connecting wire and line 202 electromagnet 23 is arranged. Switch 85 is connected to switch 140 and the latter to clutch 121. Furthermore the motor 110 is connected to switch 85 and also the aforementioned switch 103. From one contact of switch 85 a conductor leads to electromagnet 160 which is also connected to a conductor leading to the motor 110.

Switch 102 is connected to the two supply lines 201 and 202 and when this switch is at rest the electromagnets 39 and 69 are disconnected, since the contacts 215 are open. Furthermore a control device 210 is provided which is connected to motor 110 by a conductor 220, to one of the contacts 214 and furthermore by a conductor 221 to a conductor 212 leading from supply line 202 to the other contact 214.

This control device operates as follows.

It is assumed that cam 98 just passes switch 102, whereupon this switch opens contacts 214, which were previously closed, and closes for a short moment contacts 215 so that electromagnets 39 and 69 are energized. These electromagnets have holding coils so that the magnets are held in their working positions.

The control device is not affected by opening contacts 214 so that motor 110 is still connected to the source of electric power. Contacts 214 are closed upon further movement of cam 98. Upon operation of switch 103 electromagnets 39 and 69 are opened and on its way back cam 98 once more operates switch 102, whereupon contacts 214 are opened. Upon this second operation the control device 210 is operated in such a manner that it disconnects line 221 from line 220, whereby motor 110 is deenergized and together with cam 98 comes to rest. Cam 98 stops at such a place that the contacts 214 remain open.

The new cycle will start when switch 138 is acted on, whereupon cam 98 moves away from switch 102 in the direction of stationary stop 100. When during the new cycle of operation the switch 102 is reactuated, the control device gets closed.

From the foregoing it follows that this control device, in order to properly operate motor 110, is operated every time but in such a manner that upon every first operation conductors 220 and 221 are interrupted and during every second actuation these conductors are connected with each other.

It will be understood that each of the elements described above, or two or more together, may also find a useful application in other types of machine tools differing from the types described above.

While the invention has been illustrated and described as embodied in supply apparatus for machine tools, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a supply and machine tool installation for automatically supplying workpieces successively to a machine tool, in combination, machine tool means for operating on consecutive portions of an elongated workpiece and for advancing the workpiece to have the consecutive portions thereof worked on; support means; guide means carried by said support means for guiding a workpiece during movement thereof toward said machine tool means; workpiece moving means carried by said support means for forward and rearward movement and moving, during its forward movement, a first workpiece guided by said guide means toward said machine tool means; a control member; means connecting said control member to said moving means for forward movement when said moving means moves rearwardly and rearward movement when said moving means moves forwardly; release means having a portion located in the path of forward movement of said control member for automatically releasing a second workpiece to said guide means when said portion of said release means is engaged by said control member during forward movement of the latter, said workpiece moving means when moving said second workpiece forwardly into end-to-end engagement with said first workpiece and maintaining said second workpiece in said end-to-end engagement with said first workpiece before said machine tool means has finished operating on the last consecutive portion of said first workpiece, so that the operations of said machine tool means continue substantially without any interruption from one workpiece to the next; drive means operatively connected to said workpiece moving means for driving the latter forwardly and rearwardly; feeler means located at the front end of said support means for detecting the absence of a workpiece at the front end of the support means; actuating means cooperating with said feeler means for actuating the same only once each time said machine tool means advances a workpiece, so that said feeler means operates only at predetermined intervals; and means actuated by said feeler means, when the latter detects the absence of a workpiece, for initiating the operation of said drive means to drive said moving means rearwardly.

2. In a supply and machine tool installation for automatically supplying workpieces successively to a machine tool, in combination, machine tool means for operating on consecutive portions of an elongated first workpiece and for advancing said first workpiece to have the consecutive portions thereof worked on; support means; guide means carried by said support means for guiding a second workpiece during movement thereof toward said machine tool means; workpiece moving means carried by said support means for forward and rearward movement and moving, during its forward movement, a second workpiece guided by said guide means toward said machine tool means; feeler means located in the path of forward movement of said second workpiece to be engaged and moved thereby; and means actuated by forward movement of said feeler means by said second workpiece for moving said feeler means away from said second workpiece and for determining the extent of forward movement of said second workpiece into the machine tool, said workpiece moving means then maintaining said second workpiece in end-to-end engagement with said first workpiece before said machine tool means has finished operating on the last consecutive portion of said first workpiece, so that the operations of said machine tool means continue substantially without any interruption from one workpiece to the next, said means for determining the extent of forward movement of the second workpiece into the machine tool including a cam which moves forwardly together with the workpiece moving means and a switch actuated by the cam at a predetermined point in the path of forward movement thereof for stopping the operation of a feeding device of the machine tool when the work thereon is not gripped and for turning a stop member of the machine tool out of the path of the workpiece.

3. In an apparatus as recited in claim 2, a second switch located in the path of movement of said cam after it moves beyond said first-mentioned switch to be actuated by said cam for reversing the direction of movement of said cam and said workpiece moving means and for starting the operation of the feeding device of the machine tool and the stop member thereof.

4. In an apparatus as recited in claim 3, a further switch located in the path of rearward movement of said cam to be actuated thereby for stopping the operation of said drive means to stop the movement of said cam and workpiece moving means when the latter is at a position located between its forward position when the direction of movement thereof is reversed and its rear position when it engaged said second workpiece to move the latter.

5. In a supply and machine tool installation for automatically supplying workpieces successively to a machine tool, in combination, machine tool means for operating on consecutive portions of an elongated workpiece and for advancing the workpiece to have consecutive portions thereof worked on; support means; guide means carried by said support means for guiding a workpiece during movement thereof toward said machine tool means; workpiece moving means carried by said support means for forward and rearward movement and moving, during its forward movement, a first workpiece guided by said guide means toward said machine tool means; a control member; means connecting said control member to said moving means for forward movement when said moving means moves rearwardly and rearward movement when said moving means moves forwardly; release means having a portion located in the path of forward movement of said control member for automatically releasing a second workpiece to said guide means when said portion of said release means is engaged by said control member during forward movement of the latter, said workpiece moving means then moving said second workpiece forwardly into end-to-end engagement with said first workpiece and maintaining said second workpiece in said end-to-end engagement with said first workpiece before said machine tool means has finished operating on the last consecutive portion of said first workpiece, so that the operations of said machine tool means continue substantially without any interruption from one workpiece to the next; and means cooperating with said workpiece moving means for automatically moving the same, when said machine tool means starts operating on said second workpiece, rearwardly from the position it has when said machine tool means starts operating on said second workpiece to a starting position located forwardly of the position of said workpiece moving means when said control member engages said release means , said workpiece moving means remaining at rest at said starting position thereof until the work on said second workpiece has progressed sufficiently to initate the movement of a third workpiece by said release means.

6. In a supply apparatus as recited in claim 5, drive means for driving said moving means; and slip clutch means located between said drive means and moving means for transmitting the drive from said drive means to said moving means whereby when movement of the latter is retarded said clutch means can slip while said drive means continues to operate.

7. In a supply apparatus as recited in claim 6, feeler means located in the path of forward movement of the workpiece to be engaged and moved thereby; second moving means actuated by forward movement of the feeler means by the workpiece for moving the feeler means away from the workpiece and for determining the extent of forward movement of the workpiece into the machine tool, said second moving means moving a switch-actuating cam; and electromagnetic clutch means located between and operatively connected with said second moving means and said slip clutch means for transmitting the drive from said drive means to said second moving means only when said slip clutch means is not slipping and said electromagnetic clutch means is energized.

8. In a supply apparatus as recited in claim 5, said guide means including a lower guide member and an upper guide member located over said lower guide member and defining therewith a passage through which the workpiece moves, said release means being operatively connected with said upper guide member for moving the latter laterally away from its position over said lower guide member when said release means is actuated by said control member so that a workpiece can fall into said lower guide member, said release means automatically returning said upper guide member to its position over said lower guide member when said portion of said release means is no longer engaged by said control member.

9. A supply apparatus as recited in claim 8, means cooperating with said upper guide member for automatically placing a workpiece in position to fall onto said lower guide member at the next actuation of said release means by said control member.

10. In a supply and machine tool installation for automatically supplying workpieces successively to a machine tool, in combination, support means; guide means carried by said support means for guiding a workpiece during movement thereof toward a machine tool; workpiece moving means carried by said support means for forward and rearward movement and moving, during its forward movement, a first workpiece guided by said guide means toward the machine tool, said moving means having a forward limit of movement which terminates rearwardly of the front end of the supply apparatus so that when the workpiece moving means reaches the forward limit of its movement a rear end portion of the first workpiece still has not reached the machine tool; control means cooperating with said moving means for moving the latter rearwardly, after said moving means has reached its forward limit of movement, to a starting position located between said forward limit of movement and a rear limit of rearward movement of said moving means, said moving means remaining at said starting position thereof until said moving means moves rearwardly to initiate the release of a second workpiece; release means cooperating with said control means to be actuated thereby for releasing a second workpiece to said guide means when said moving means is in the region of said rear limit of its rearward movement, said control means then cooperating with said moving means for again moving the same forwardly so that the moving means engages the second workpiece to advance the latter into engagement with the first workpiece which then continues its forward movement while engaged by the front end of the second workpiece; and machine tool means operating on said first workpiece while it is engaged by said front end of said second workpiece and while said moving means maintains said first and second workpieces in end-to-end relation so that said machine tool means is supplied substantially continuously with workpieces which follow one another in end-to-end relation.

11. In a supply apparatus as recited in claim 10, said guide means guiding said rear end portion of said first workpiece while said release means releases the second workpiece to said guide means.

12. In a supply apparatus as recited in claim 10, the front end portion of said second workpiece acting as an ejector for ejecting from the machine tool the last residual portion of the first workpiece.

13. In a supply and machine tool installation for automatically supplying workpieces to a machine tool, in combination, machine tool means for performing operations on consecutive portions of an elongated first workpiece and for longitudinally advancing said first workpiece to have said consecutive portions thereof worked on by said machine tool means; magazine means containing a plurality of workpieces; guide means for guiding a second workpiece coaxially with said first workpiece longitudinally toward said machine tool means; means cooperating with said magazine means and guide means for releasing said second workpiece from said magazine means to said guide means while said machine tool means is still performing operations on said first workpiece; and workpiece moving means cooperating with said guide means for advancing said second workpiece into end-to-end engagement with said first workpiece and for maintaining said second workpiece in end-to-end engagement with said first workpiece before the last consecutive portion thereof has been operated on by said machine tool means so that the machine tool means operates substantially without interruption from one workpiece to the next; and means cooperating with said workpiece moving means for moving the latter rearwardly, when said machine tool means starts performing operations on said second workpiece, to a starting position located forwardly of the position of said workpiece moving means when the latter engages said second workpiece to advance the latter, and maintaining said workpiece moving means at rest in said starting position thereof until the next workpiece is to be moved into end-to-end engagement with said second workpiece whereupon said workpiece moving means is then moved rearwardly to initiate the movement of said next workpiece into end-to-end engagement with said second workpiece.

References Cited in the file of this patent

UNITED STATES PATENTS

| | | |
|---|---|---|
| 1,877,693 | Rich | Sept. 13, 1932 |
| 2,043,772 | Rich | June 9, 1936 |
| 2,595,522 | Harney | May 6, 1952 |
| 2,652,877 | Travis | Sept. 22, 1953 |
| 2,674,779 | Herzog | Apr. 13, 1954 |
| 2,742,656 | Fischer | Apr. 29, 1956 |
| 2,746,128 | Barron | May 22, 1956 |
| 2,848,786 | Kendall | Aug. 26, 1958 |

FOREIGN PATENTS

| | | |
|---|---|---|
| 571,614 | Germany | Mar. 8, 1933 |

UNITED STATES PATENT OFFICE

CERTIFICATE OF CORRECTION

Patent No. 3,131,587 May 5, 1964

Karl Spohn et al.

It is hereby certified that error appears in the above numbered patent requiring correction and that the said Letters Patent should read as corrected below.

Column 11, line 69, for "when" read -- then --.

Signed and sealed this 8th day of September 1964.

(SEAL)
Attest:

ERNEST W. SWIDER
Attesting Officer

EDWARD J. BRENNER
Commissioner of Patents